(12) United States Patent  
Seyfried

(10) Patent No.: US 8,064,121 B2  
(45) Date of Patent: Nov. 22, 2011

(54) ACOUSTO-OPTICAL COMPONENT

(75) Inventor: Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 175 days.

(21) Appl. No.: 12/514,412

(22) PCT Filed: Aug. 29, 2007

(86) PCT No.: PCT/EP2007/058966  
§ 371 (c)(1),  
(2), (4) Date: May 11, 2009

(87) PCT Pub. No.: WO2008/055721  
PCT Pub. Date: May 15, 2008

(65) Prior Publication Data  
US 2010/0053725 A1   Mar. 4, 2010

(30) Foreign Application Priority Data  
Nov. 9, 2006   (DE) .......................... 10 2006 053 187

(51) Int. Cl.  
*G02F 1/11* (2006.01)  
*G02F 1/29* (2006.01)  
*G02B 26/08* (2006.01)
(52) U.S. Cl. ....................................... 359/285; 359/298
(58) Field of Classification Search .......... 359/285–287, 359/290–292, 295, 298  
See application file for complete search history.

(56) References Cited

U.S. PATENT DOCUMENTS

| 3,729,251 | A | 4/1973 | Hearn |
| 4,348,079 | A | 9/1982 | Johnson |
| 4,516,838 | A | 5/1985 | Bademian |
| 5,889,355 | A | 3/1999 | Shah |
| 6,307,665 | B1 | 10/2001 | Kim et al. |
| 6,753,896 | B2 * | 6/2004 | Shirota et al. ................. 347/236 |
| 2002/0191264 | A1 | 12/2002 | Vernackt et al. |

FOREIGN PATENT DOCUMENTS

| DE | 10115488 | 12/2001 |
| EP | 1500966 | 1/2005 |
| WO | 85/01591 | 4/1985 |
| WO | 97/30371 | 8/1997 |

OTHER PUBLICATIONS

Chang, I.C., Katzka, P., Jacob, J., Estrin, S.; Programmable Acousto-Optic Filter, 1973 Ultrasonic Symposium, pp. 40-45, Applied Technology Division of Itek Corpoation, USA.

* cited by examiner

*Primary Examiner* — David N Spector  
*Assistant Examiner* — Brandi Thomas  
(74) *Attorney, Agent, or Firm* — Schlee IP International, P.C.; Alexander R. Schlee

(57) ABSTRACT

An acousto-optical component is suggested, in particular for use in the beam path of an optical arrangement, preferably of a microscope, with a crystal for the passage of light. Sound waves are generated via an electrical transducer and passed through the crystal. The sound waves passing through the crystal affect the optical properties of the crystal and therefore the light passing through the crystal. For exerting a variable influence on the light passing through the crystal, the sound waves passing through the crystal, or the acoustic field in the crystal, are/is variable.

22 Claims, 9 Drawing Sheets

ACOUSTO-OPTICAL COMPONENT

CROSS-REFERENCE TO RELATED APPLICATIONS

This application is a national phase entry based on the International Patent Application PCT/EP2007/058966 filed on Aug. 29, 2007 that claims the priority of the German patent application DE 102006053187.6 dated Nov. 9, 2006, the content of which is herewith incorporated by reference.

BACKGROUND OF THE INVENTION

The invention relates to an acousto optical element, in particular for disposition in the beam path of an optical device, preferably a microscope, comprising a crystal for transmitting light, wherein via an electrical converter sound waves are generated and are passed through the crystal and wherein the sound waves passing through the crystal change the optical properties of the crystal and therefore influence the light penetrating through the crystal.

The present invention relates in general to an acousto optical element, i.e. to an element by means of which light beams can be manipulated depending on the acoustic situation.

Acousto optical elements or components are known from practical application in many varieties. In this regard, it is particularly referred to acousto optical elements such as an AOM (acousto optical modulator), an AOD (acousto optical deflector), an AOTF (acousto optical tunable filter), frequency shifter or the like. For related embodiments comprehensive scientific literature is known, for instance "Acousto-Optics" from Adrian Korpel, New York 1997, "Acousto-optic devices" from Jieping Xu and Robert Stroud, New York 1992 and "Design and Fabrication of the Acousto-Optic devices" from Akis P. Goutzoulis and Dennis R. Pape, New York 1994.

In this connection, it is pointed out that with regard to optoacoustic elements there are various terms, explanations and operating principles and properties. In this respect it seems necessary to discuss the invention behind this background, namely discuss general properties of optical components.

Acousto optical elements consist typically of a so-called acousto optical crystal and an electrical converter attached thereto (in the literature often named transducer). Typically, the converter comprises a piezo material as well as one electrode above and one electrode below the piezo material. By electrically subjecting the two electrodes to a radio frequency that is typically in the range of 30 to 800 Mhz the piezo material is induced to oscillate so that a sound wave, i.e. an acoustic wave is generated and passes thereafter through the crystal. Mostly, the acoustic wave is absorbed or reflected at the opposite side of the crystal after it has passed through an area of optical interaction.

Acousto optical crystals have the properties that the generated wave changes the optical properties of the crystal, wherein by means of the acoustic wave sort of an optical grating or a comparable, optically active structure is induced, for example a hologram. By means of the crystal the light passing therethrough is deflected at the optical grating. Accordingly, the light is deflected in several diffractive orders in the direction of diffraction.

Acousto optical elements exist that influence the entire incident light more or less independently from the wavelength. In this connection, as examples, the aforementioned elements AOM, AOD and frequency shifters are pointed out. Further, meanwhile elements exist that act upon incident light selectively with regard to individual wavelengths (AOTFs). Frequently, such acousto optical elements consist of birefringent crystals, such as tellurium dioxide, wherein the position of the crystal axis in relation to the plane of incidence of the light and its polarization determine the optical properties of the respective elements.

For practical application, use of the light that has not been influenced by the diffraction (zeroth diffractive order), the light that has been deflected into the various diffractive orders, or both types of light are used.

In case of a conventional acousto optical element as it is known from practical application, the radio frequency is supplied through a coax cable to the acousto optical element. There, on a circuit board, an impedance matching is conducted, so that a radio frequency reflection is prevented and therefore as high a radio frequency power as possible arrives at the crystal that has a different impedance as the radio frequency cable. From the circuit board the radio frequency is transmitted further to the converter (transducer) that is provided on the crystal where the acoustic wave is generated.

It is essential for this acousto element according to prior art that various layers are provided on the surface of the crystal. The lowermost layer that is applied to the crystal consists of metal and provides the negative electrode. It is typically connected via a circuit board with the outer conductor of a coax cable transmitting the radio frequency. Upon the lowermost metal layer, a layer of piezo material follows. This material is typically lithium niobate. Upon this layer of piezo material the second metallic electrode follows, typically connected to the inner conductor of the coax cable. When subjecting the two electrodes to the radio frequency an alternating electrical field is generated between the two electrodes that induces the piezo element to oscillate between them so that from this area an acoustic wave spreads through the interior of the crystal. The acoustic wave is typically reflected away from the opposite side of the crystal. By roughening the opposite side of the crystal it is possible to absorb a major portion of the acoustic wave so that as little reflection as possible back into the acousto optical interaction area of the crystal occurs.

In particular when the converter is large the capacitance of the capacitor formed by the two electrodes is much too high for allowing a useful impedance matching between the radio frequency cable and the acousto optical crystal. In this situation a trick is applied, namely the converter is split into two parts, wherein the two parts are connected in series. For this purpose it is necessary to pole the piezo material in both parts differently so that the two converter halves do not work against each other. In that case the inner conductor of the coax cable is connected to the positive electrode. The outer conductor of the coax cable is connected with the negative electrode that is provided on the other side of the piezo material. The converter provides a capacitance to which the alternating electrical field is applied.

In case of a split converter the inner conductor of the coax cable is connected with the positive electrode that, however, does at maximum cover half of the front side of the converter. The respective counter electrode is at the same time the counter electrode with respect to the negative electrode and covers the other half of the front side of the converter. In this case, the capacitances of two capacitances that are electrically interconnected in series are provided. Consequently, by splitting the converter into two parts, a reduction of the capacitance down to one quarter is achieved wherein the size of the sound field generating area is maintained. In this connection it has to be taken care that the piezo layers of the two halves of the converter are poled in opposite directions since these would otherwise work against each other and the generated sound field would then not be the same as in case of the non-split converter.

The structure of the converter, in particular its size and shape, determines how the acoustic field in the interior of the crystal is shaped. This results in defining the optical properties of the electrically interconnected crystal.

In case of an acousto optical tunable filter (AOTF) the spectral characteristics of the deflected light is determined substantially by the Fourier-transformed of the converter form. This means that wide converters provide a sharper spectral transmission function in comparison with more narrow converters. Consequently, an AOTF with a wide converter cuts out from the incident light a spectrally more narrow range compared to an AOTF with a converter that is narrower. The AOTF with a wide converter comprises therefore a higher spectral resolution. In the reverse case, an AOTF with a narrower converter has a higher spectral bandwidth and deflects therefore more portions of the spectrum of the incident light.

While in the past acousto optical elements as known from the prior art, in particular AOTF, were typically used for adjusting and controlling the light intensities, there has been a meanwhile stronger tendency making it necessary to use such acousto optical elements for cutting or filtering out a particular portion from the light having more or less broad band spectrum. In this connection it is for instance referred to DE 101 15 488 A1.

Such an application of the acousto optical element can be mainly found in cutting out particular spectral portions of light from a light source emitting a continuous spectrum or a spectrum of a wide bandwidth for the purpose of illumination (white light laser, broad band laser, ultra-short pulsed laser, superluminescent-LED, or other superluminescent light sources, ASE light sources, light bulbs, Point-Source-LEDs and other LEDs, sunlight, starlight or the like). Another field of practical application is cutting out particular light portions of a spectrum for the purpose of detection. In this connection, for example, it is referred to conventional, programmable spectral filters. Moreover, the application of an acousto optical element as a component in a programmable beam splitter is of significance in this connection.

However, for the acousto optical elements that are available at present and in particular AOTFs the optical properties of the respective elements are predefined and non-changeable, namely by the choice of a particular converter design. A later change or adjustment of the bandwidth of the spectrum of an AOTF is so far not possible while, in light of the explanations above, this would be desirable.

SUMMARY OF THE INVENTION

The invention is therefore based on the object to design and advance the acousto optical element as described above such that it can be applied for various purposes in a variable manner.

According to the invention, the acousto element as described above is characterized in that for allowing variable influencing of the light penetrating through the crystal, the sound waves running through the crystal or the sound field established in the interior of the crystal can be changed.

The invention has therefore revealed that it is in general possible to provide acousto optical elements with adjustable properties. The flexibility of the acousto optical element follows from the fact that the light passing through the crystal can be influenced variably, namely in that the acoustic waves passing through the crystal or the sound field that is defined by this acoustic wave is changed. In this manner, it is for instance possible to adjust the bandwidth of the AOTF in the application for confocal microscopy variably so that in connection with a light source having a continuous spectrum, for instance a white light laser, the sharpness of the spectral resolution of the exciting light as well as its intensity can be adjusted individually and in a very fast manner.

In an advantageous manner, a change of the sound wave or of the sound field established in the interior of the crystal is achieved by actuating and/or interconnecting the converter. By means of the converter the sound waves running through the crystal are influenced so that consequently the light passing through the crystal is influenced via the acoustic waves in a variable manner. This creates a mechanism for variably controlling the acousto optical element.

Specifically, the converter may consist of several individual converter segments that are independent from each other. The converter segments can be provided on, at or within the crystal. The converter segments may have the same or a different form and/or size.

In particular for the purpose of defining a homogeneous sound field within the crystal it can be advantageous if the individual converter segments itself are symmetrical and further if these are disposed symmetrically with respect to each other. If a segment is provided in the middle, one segment at the right and one segment at the left can be provided with respect to the one in the middle in a symmetrical manner.

From a circuit point of view it is advantageous if the converter segments can be switched or activated individually or in groups. Advantageously, the converter segments can be switched symmetrically, i.e. can be switched on or off in a symmetric fashion. It is advantageous for generating a homogeneous sound field if the converter segments can be switched on or off in pairs.

With respect to the specific design of the converter it is pointed out that it may comprise as the lowermost layer a negative electrode, preferably made of metal. On this lowermost layer an intermediate layer of a piezo material is formed. This piezo material can for instance be lithium niobate. An uppermost layer is formed on the intermediate layer as a positive electrode, preferably made from metal.

Preferably, the electrode is connected to another conductor of a two-core electric cable. This cable may, for instance, be a coax cable wherein the negative electrode is connected with the outer conductor of the coax cable and the positive electrode is connected with the inner conductor of the coax cable.

Referring to the segmenting of the converter as discussed above, the negative electrode and/or the positive electrode and/or the piezo material are segmented for forming of the converter segments. For instance, it is possible that only the electrodes are segmented, while the intermediate layer of piezo material is continuous.

With respect to a quasi monolithic design of the entire acousto optical element it is advantageous if all elements are provided on kind of an attachment panel. Specifically, the crystal together with the integral converter is arranged on the attachment panel. The crystal can be attached to a circuit board in a fixed manner, said circuit board being arranged on the attachment panel. It is further possible that the circuit board is arranged at the side of the actual converter on the attachment panel. Via the circuit board, the converter or the converter segments are supplied with a radio frequency, causing it to oscillate resulting in acoustic waves that will finally pass through the crystal.

The respective elements, i.e. the converter segments, are electrically connected with the circuit board. The connection is typically achieved by bonding wires, wherein the respective electrodes of the converter are connected with the circuit board.

The radiofrequency subjecting the converter are fed via electrical cables, preferably via coax cables, from an external generator to the circuit board. In this case, a singular coax cable can be used that is connected to the circuit board. In addition it is possible that the circuit board is connected a generator or several generators via two or more cables, preferably via coax cables, for being supplied with a variety of different or a number of the same radio frequencies. This allows subjecting the circuit board multiply with radio frequencies of various frequency ranges.

In a particularly advantageous manner the circuit board comprises electronic components wherein these are active components. Via these components, radio frequencies can be switched to the individual converter segments, preferably based on a respective control signal. The control signal is provided via a separate control cable from an external control unit. The signals that are provided via the control cable to the electronic circuit board or supplied to the electronic components thereon are provided for a defined interconnecting of the converter segments.

Via the electronic components an adjustment of the power of the radio frequency is conducted, in particular with regard to the respective form and size of the individual converter segments. In this manner, the circuit board provides for distributing the radio frequency to the various converters or converter segments and adjusts the respective power to the shape and size of the individual converter segments. The information required for the variety of different interconnections of the individual converter segments are transmitted via a control cable to the circuit board wherein it is further advantageous in this connection if the circuit board comprises its own power supply. In this connection, the electronic components provide active electronics and may comprise or build a microprocessor that is likewise allocated to the circuit board.

The circuit board therefore switches depending on the requirements individual converter segments or groups thereof on or off and varies the supplied power.

In a further advantageous manner, the circuit board comprises a readable and possibly writeable data memory allowing storing of information, for example, information for interconnecting or calibrating the acousto optical element.

The acousto optical element can for instance be an AOM (acousto optical modulator), an AOD (acousto optical deflector), an AOTF (acousto optical tunable filter), or an AOBS (acousto optical beam splitter). Any other applications are possible since the acousto optical element according to the invention can be any element allowing a variable influencing of the light passing through the element.

There are various options how the teaching according to the present invention can be embodied and enhanced in an advantageous manner. For this purpose, on one hand it is referred to the patent claim 1 and the patent claims depending thereon, and on the other hand it is referred to the following description of the embodiments of the invention by referring to the drawings. In connection with this description of preferred embodiments of the invention by referring to the drawings also generally advantageous embodiments and advancements of the teaching are described.

DETAILED DESCRIPTION OF THE DRAWINGS

Figure 1:
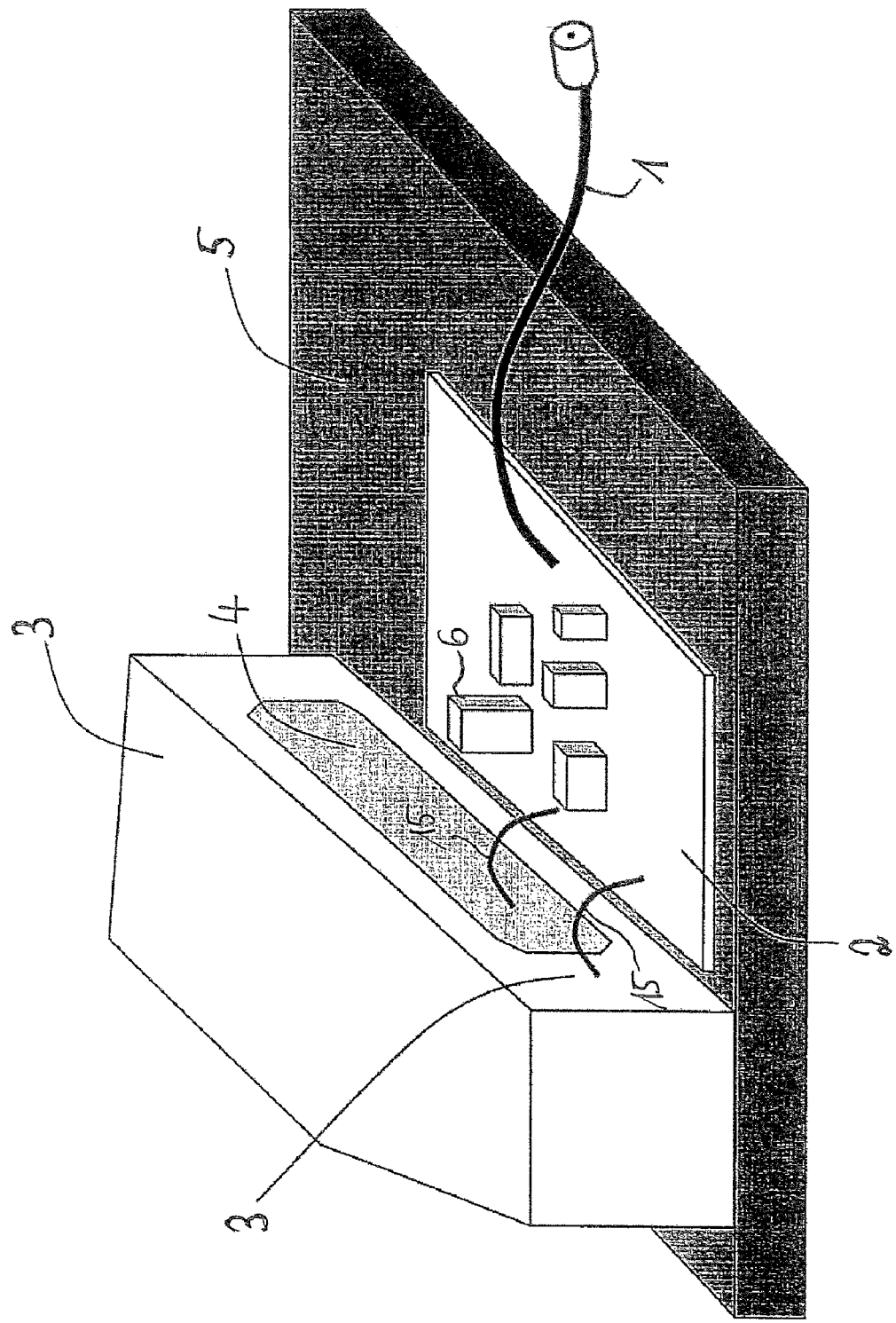
FIG. 1 a schematic view of a conventional acousto optical element with predefined properties, FIG. 2 a schematic front view of a crystal that is subject of FIG. 1 with an integrated converter, FIG. 3 a schematic front view of a second embodiment of a crystal that is subject to FIG. 1 and has an integrated, split converter, FIGS. 4a to 4d a schematic depictive view and circuit diagram of the subject of FIGS. 2 and 3, FIG. 5 a schematic view according to FIG. 1 of an embodiment of the acousto optical element according to the invention having a segmented converter, FIG. 6 a schematic view according to FIG. 1 showing a further embodiment of the acousto optical element according to the invention having a segmented converter, FIG. 7 a schematic front view of an embodiment of the crystal together with a converter that is the subject of FIG. 5 or 6, FIG. 8 a schematic front view of a further embodiment of the crystal together with a converter that is the subject of FIG. 5 or 6, and FIG. 9 a schematic view demonstrating the application of the acousto optical element according to the invention in a confocal laser scanning microscope, namely in the form of an AOTF and AOBS.

FIG. 1 shows a typical structure of acousto optical components according to prior art. The radio frequency is fed through the coax cable to the acousto optical element. In this element, on a circuit board 2, impedance matching is conducted so that the RF reflection is prevented and as much of the RF power as possible arrives at the crystal 3 that has a different impedance than the RF cable. From the circuit board 2 a radio frequency is conducted further to the converter 4 provided on the crystal 3 where the acoustic wave it is generated.

Figure 2:
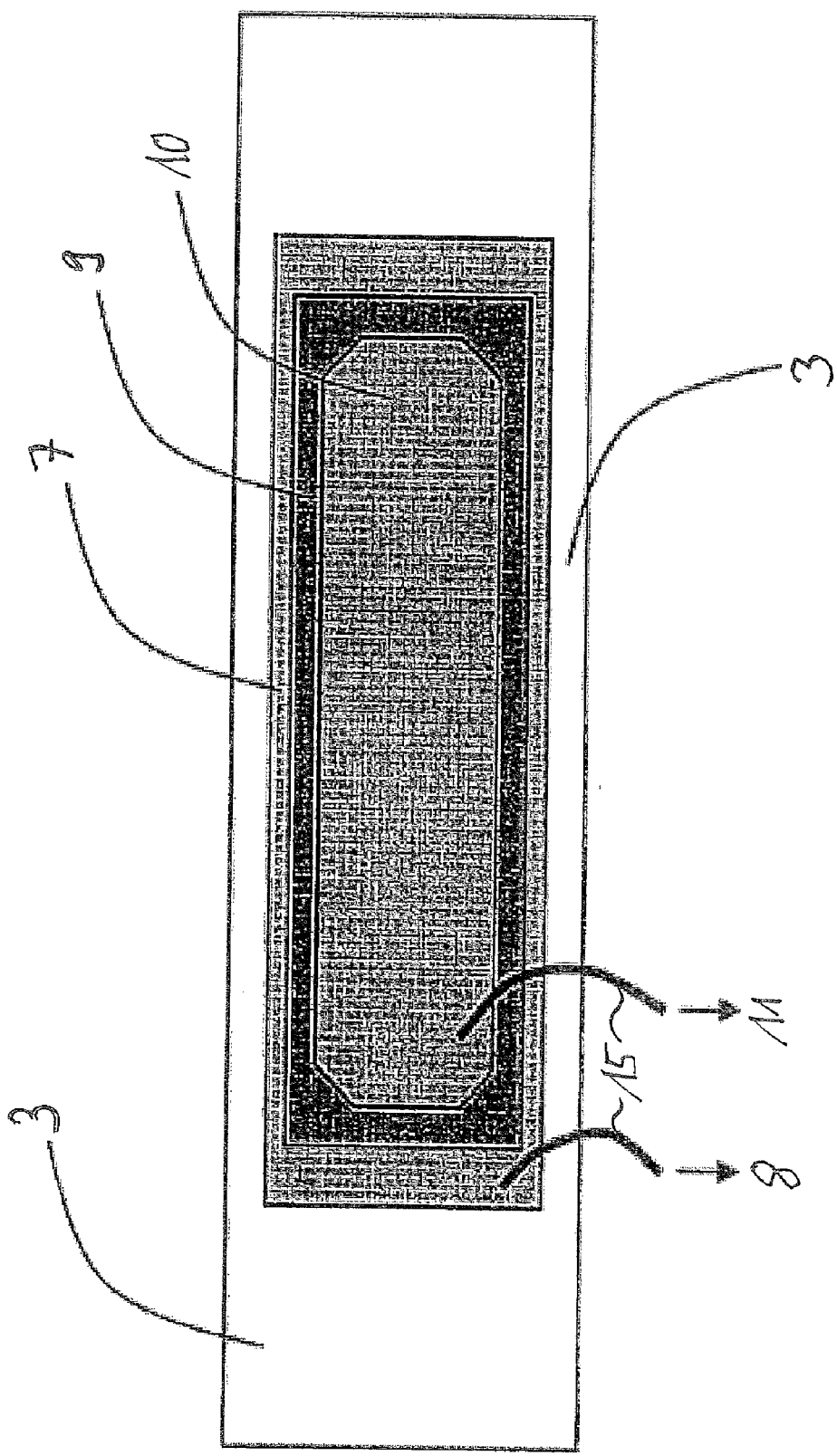

FIG. 2 shows a detailed side view of the acousto optical crystal 3. It is visible that several layers are provided on the crystal side. The lowermost layer on the crystal 3 consists of a metal layer serving as a negative electrode 7 and is connected, for instance via the circuit board 2, to the outer conductor 8 of the coax cable 1 conducting the radio frequency. Following next after the metal layer 7 a layer 9 consisting of a piezo-electric material is provided, often lithium niobate, followed by a second metallic electrode (positive electrode 10) that is connected to the inner conductor 11 of the coax cable 1. When supplying the two electrodes 7, 10 with the radio frequency, an alternating electrical field is generated between the two electrodes 7, 10, inducing the piezo element disposed therebetween to oscillate so that an acoustic wave can spread into the interior of the crystal 3. This acoustic wave is, for the most part, reflected away from the opposite side of the crystal. Further, it is attempted, for example by roughening the opposite crystal side, to absorb as much of the acoustic wave as possible so that as little as possible of the spurious reflections back into the area of acousto optical interaction happens.

Figure 3:
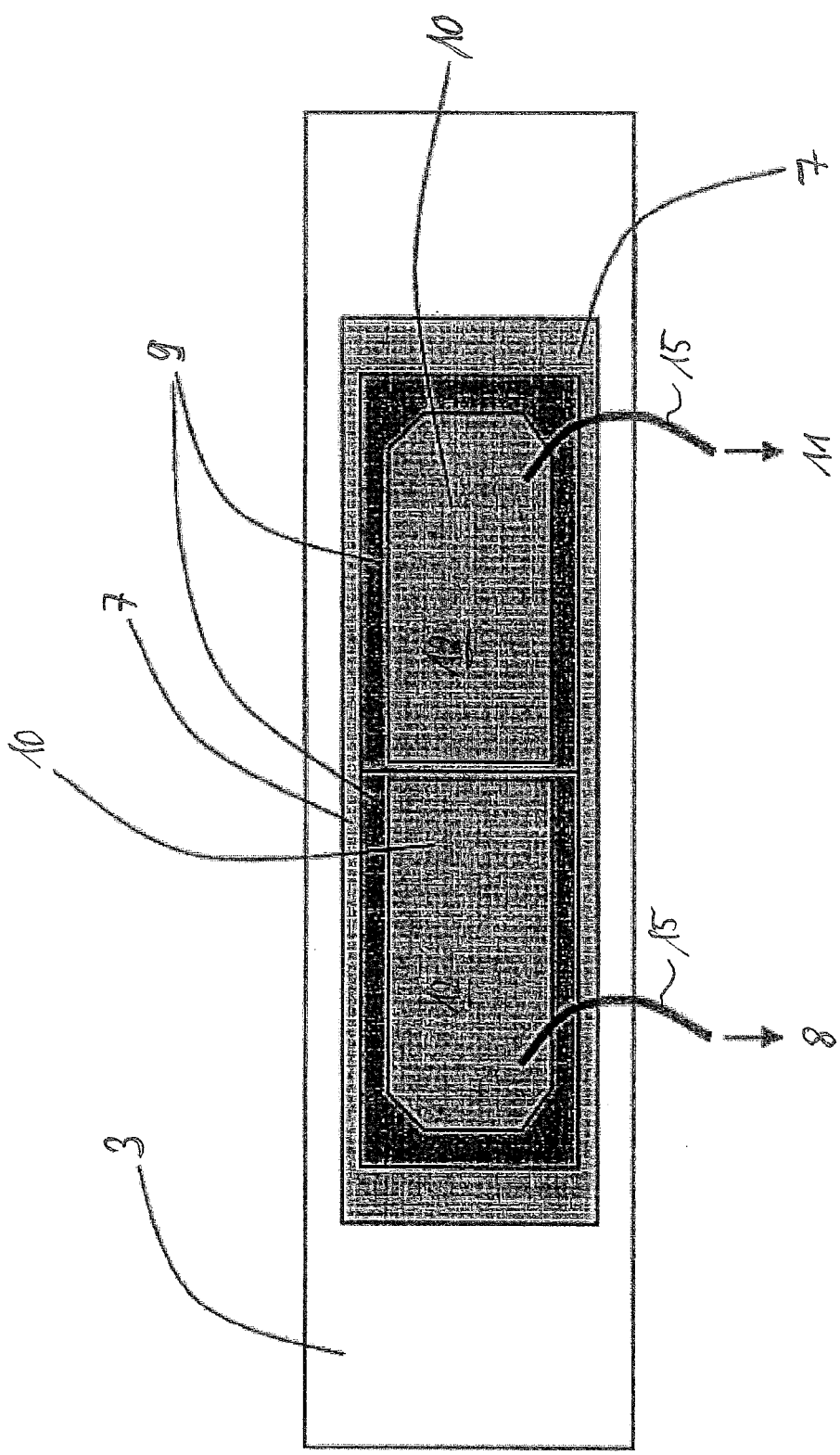
Figure 4:
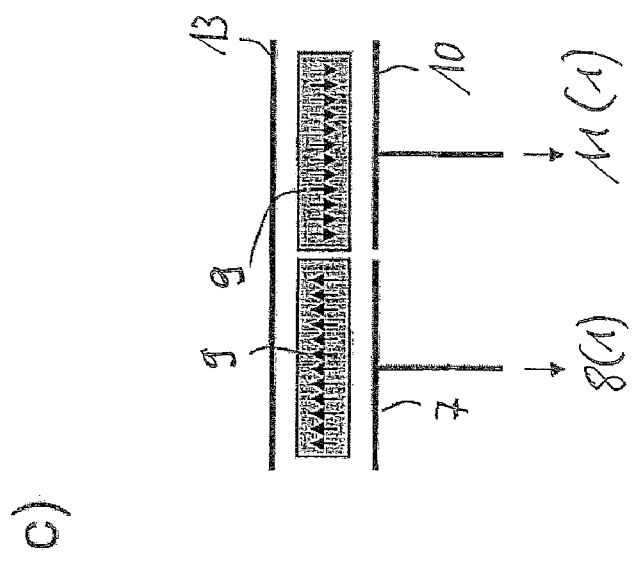
Figure 4:
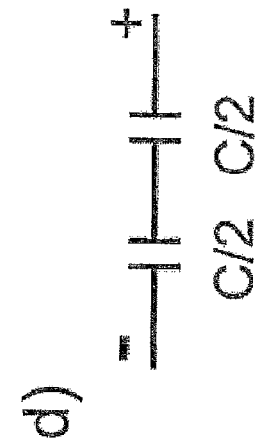
Figure 4:
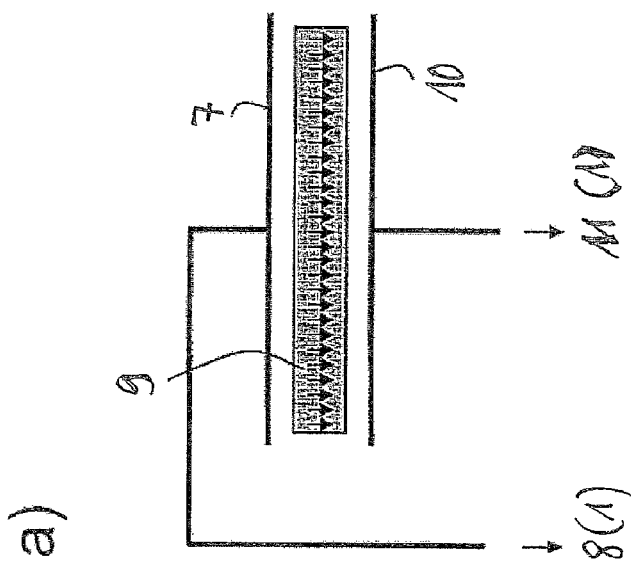
Figure 4:
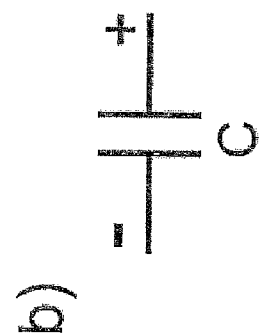

In particular if the converter 4 is large, the capacitance formed by the two electrodes 7, 10 forming a capacitor is too high for a useful impedance matching between the RF cable 1 and the acousto optical crystal 3. In this situation, the trick as depicted in FIG. 3 is applied wherein the converter 4 is divided into two parts (converter segments 12) that are connected in a series. For this purpose, it is necessary to pole the piezo element 9 differently so that the converter segments 12 are not working against each other. This can be gathered from the schematic view according FIG. 4.

FIG. 4a shows the circuit related to FIG. 2. The inner conductor 11 of the coax cable 1 is connected to a positive electrode 10 and the outer conductor 8 with the negative electrode 7 is provided on the other side of the piezo material 5, 9. The related circuit diagram is shown in FIG. 4b. The converter 4 provides a capacitance that is subjected to the alternating electrical field.

FIG. 4c shows the schematic view of the split converter shown in FIG. 3. The interior conductor 11 of the coax cable 1 is likewise connected to a positive electrode 10, which does, however, only cover half of the front side of the converter. The related counter electrode 13 provides at the same time the counter electrode related to the negative electrode 7 that covers the other half of the front side of the converter. The respective circuit diagram is shown in FIG. 4d. In lieu of capacitance C, this circuit has the capacitance of two capacitances C/2 i.e. in total only C/4. By splitting the converter 4 into two parts, a reduction of the capacitance to only one fourth is achieved, wherein at the same time the same surface for generating sound waves is maintained. It is to be noted that the piezo layers of the two halves of the converter are poled in an opposite fashion, since these would otherwise work against each other with the consequence that the sound field would not be the same as the sound field of the non-split converter 4.

The design of the converter 4, in particular its size and shape, determines how the sound field in the interior of the crystal 3 is shaped and therefore determines the optical properties of the electrically interconnected crystal 3. It is in particular known that in case of acousto optical filters allowing variable frequencies (acousto optical tunable filters, AOTF) the spectral distribution of the deflected light is determined substantially by the Fourier transformed of the converter form. This means, for example, that wider converters comprise a sharper spectral transmission function than more narrow converters, i.e. an AOTF having a wider converter cuts out from the incident light a spectrally more narrow range as an AOTF having a more narrow converter, i.e. has a higher spectral resolution. To the contrary, an AOTF having a narrower converter has a higher spectral bandwidth and does therefore deflect more spectral portions of the incident light.

While in the past acousto optical elements, mainly AOTF, were used for controlling the light intensities and adjusting these, the tendency now goes into the direction of using these components for cutting out specific portions from light of a more or less wide bandwidth (see for instance our D 101 154 488 A1).

Such an application of the acousto optical element can be mainly found in cutting out particular spectral portions of light from a light source emitting a continuous spectrum or a spectrum of a wide bandwidth for the purpose of illuminating (white light laser, broad band laser, ultra-short pulsed laser, superluminescent-LED, or other superluminescent light sources, ASE light portions for the purpose of detection, programmable spectral filters, etc.). Moreover, the application of an acousto optical element as a component within a programmable beam splitter (AOBS) has some significance.

However, the acousto optical elements that are at present available, and in particular in case of AOTF, the choice of a particular converter design determines the optical properties of the component, and defines in particular the properties of the AOTF in an unchangeable manner. A later change is not possible, for instance of the spectral bandwidth of AOTF. This is, however, more desirable, in particular if the component is used for cutting out a particular spectral portion of incident light since the required properties of the component might vary readily.

Figure 5:
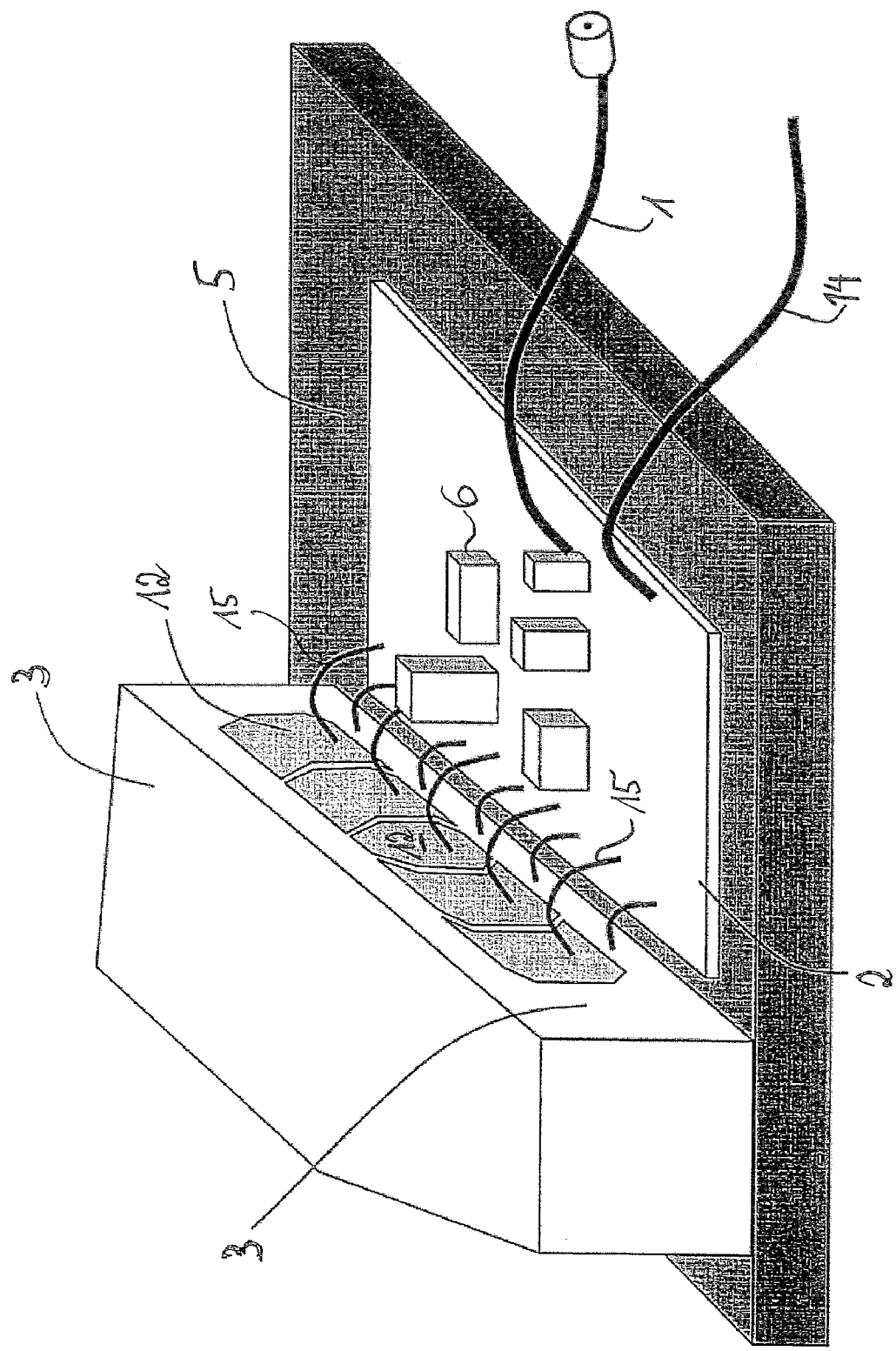

FIG. 5 demonstrates the core thought underlying the invention. For being able to vary the properties of the acousto optical element readily, a converter 4 is used that consists of several converter segments 12 that can be electrically interconnected in a variety of manners. For instance, it is possible to interconnect only the converter segments 12 in the middle of the converter 4, so that a sound wave is created that spreads only over a limited range in space. If the acousto optical element is an AOTF, this results in a broader width of the spectrum. If it is intended to narrow the bandwidth of the spectrum, or accordingly to enlarge the sound wave, optionally the converter segments 12 that are provided more on the outside can be interconnected in pairs. This increases the spectral resolution of the AOTF up to the mode when all converter segments 12 are interconnected. Neither a symmetrical shaping of the converter segments is absolutely necessary, nor the interconnecting of the further converter segments in pairs, but it would be advantageous.

Also the shape and arrangement of the individual converter segments 12 allows a high flexibility. It is important that by the various options of electrical interconnection the sound wave can be shaped differently in the interior of the crystal 3 so that properties of the component can be changed. In addition to the spectral bandwidth of the deflected light of the AOTF it is possible to change the entire spectral transmission function for the deflected light as well as for the non-influenced light by using appropriately separately interconnectable converter segments 12. In particular, the form of the transmission function can be changed.

Controlling of the various converter segments 12 can be achieved in various manners. FIG. 5 shows an arrangement having a single coax cable 1 transmitting the radio frequency to the circuit board 2. The circuit board 2 provides for distributing the radio frequencies to the various converter segments 12 and adjusts the respective electrical powers to the shape and size of the individual converter segments 12. The information needed for interconnecting the individual converter segments 12 in a variety of manners are transmitted to the circuit board 2 via a control cable 14 that also provides, in an advantageous manner, an electrical power source for the active electronics or for a microprocessor. The circuit board 2 switches depending on the requirements the individual converter segments 12 on or off and varies the applied power.

Advantageously, the circuit board 2 also has a writeable and readable memory section able to store information that can for instance be used for electrically interconnecting or for calibrating.

Figure 6:
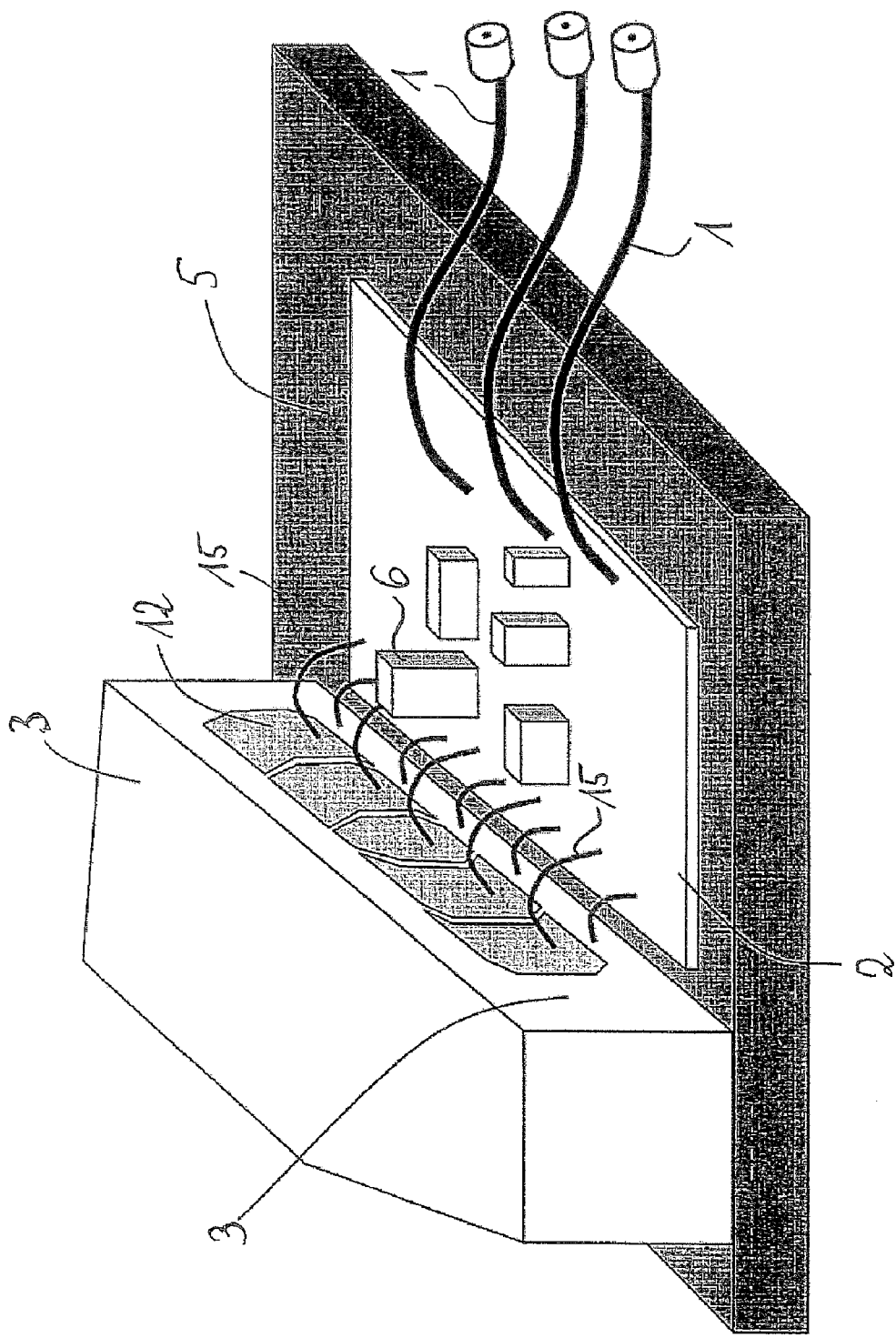

FIG. 6 shows a further possible structure of an acousto optical element featuring a variation in the electrical interconnecting on the side of the generation of the radio frequency or at least not in the immediate vicinity of the acousto optical crystals 3. In this case, several radio frequency cables (coax cables) lead to the circuit board 2 and are allocated to the various converter segments 12. Also, a mixed arrangement comprising a mix of the embodiments shown in FIGS. 5 and 6 is possible and advantageous.

Figure 7:
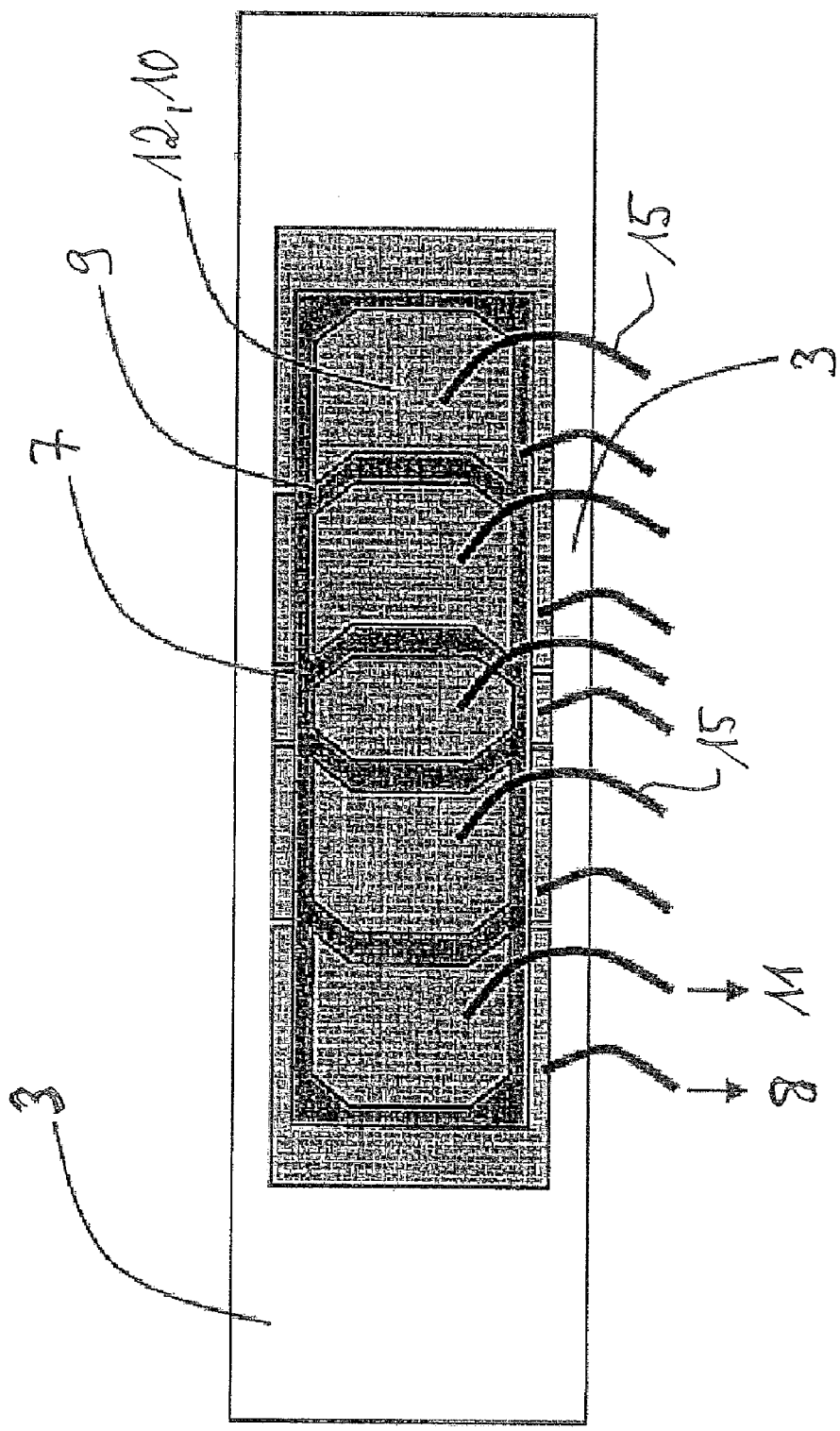
Figure 8:
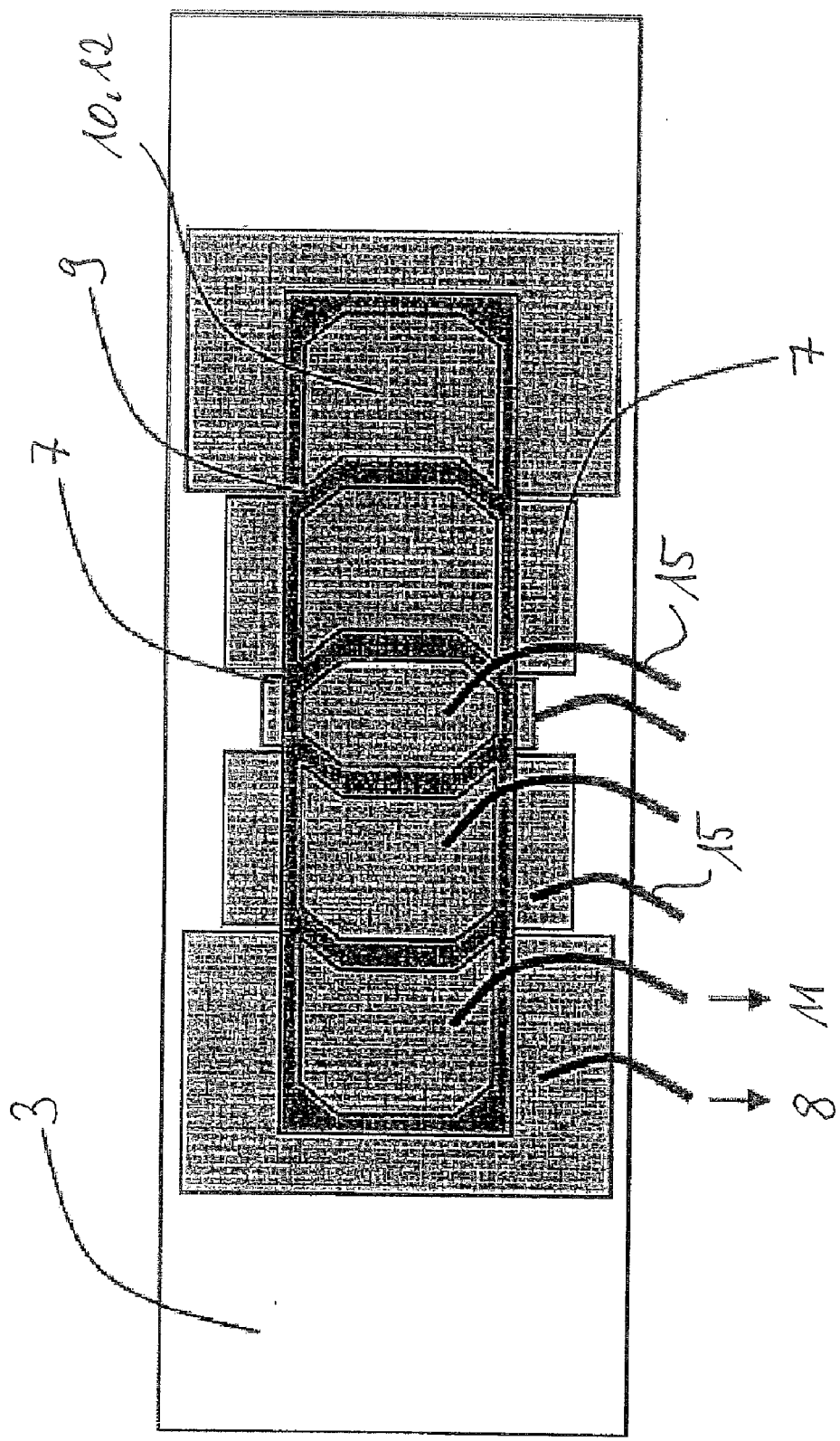

The FIGS. 7 and 8 show various embodiments of converters 4 wherein it has to be noted that regarding the shape, size and arrangement of the individual converter segments 12 there is a lot of flexibility. It has to be noted in particular that the size and shape of the individual electrodes and piezo layers can be adapted independently from each other to the optical requirements and impedance requirements. In case of the embodiments according to FIG. 8 the impedance matching is achieved alone by adapting the size of the negative electrode 7 provided on the side of the crystal. Also, the electronic components 6 of the circuit board 2 are adapted to the respective impedance situation.

It is pointed out further that in connection with switchable converter 4 the principle of the split converter 4 can be applied for the purpose of the impedance matching (as in FIGS. 3 and 4), wherein parts of the piezo materials have to be poled in an inverted manner. Advantageously, the converter segments 12 are disposed such that as little areas of the piezo materials that are poled differently as possible are required since these areas of the piezo materials have to be attached independently from each other on the crystal 3 resulting in a higher complexity.

Figure 9:
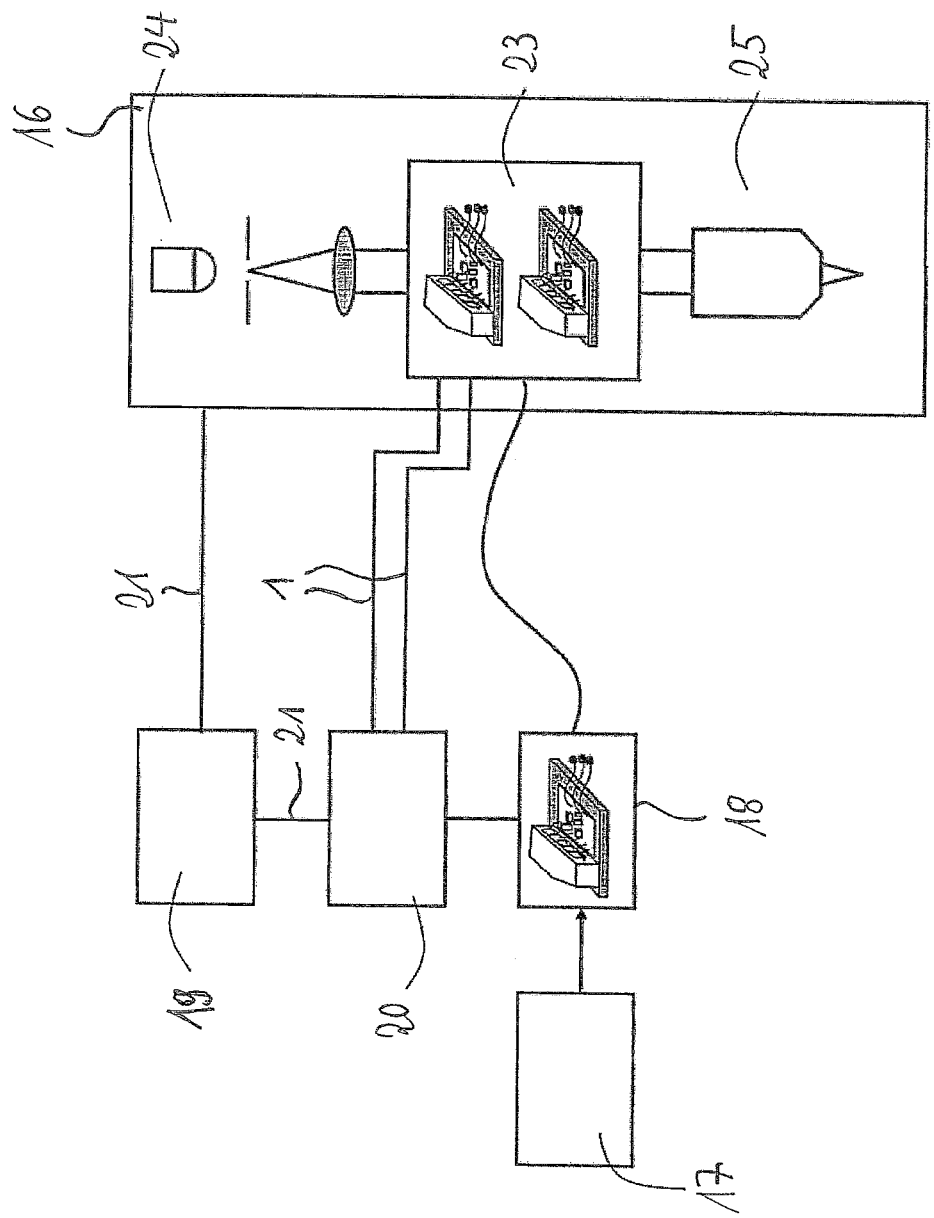

FIG. 9 depicts the application of the component according to the invention in a confocal laser scanning microscopes 16. From a light source 17 having at least over ranges of the bandwidth a continuous spectrum (white light lasers and the like), one or more portions of the spectrum are cut out for the purpose of illumination by means of a first acousto optical component according to the invention that is preferably an AOTF 18. The control unit 19 of the laser scanning microscope 16 controls, in addition to the microscope, also one or more of the RF generating units 20 supplying the necessary radiofrequency to the acousto optical component and controlling possibly also via control conductors 21 the interconnection of the individual converter segments 12. The light that has been deflected and therefore selected by means of the acousto optical element AOTF 18 is preferably conducted via a light conductor 22 to the scanning head of the laser scanning microscope 16 where it serves the purpose of illumination.

Particularly advantageously, light is coupled into the microscope by means of an optical wave, i.e. via an acousto optical beam splitter 23 (AOBS), wherein the microscope comprises a detector 24 and an objective 25. The optical switch comprises according to the invention acousto optical elements that are respectively actuated and controlled by a radio frequency generating unit 20.

For avoiding repetition, further advantageous embodiments of the element according to the invention can be gathered from the general part of the description as well as from the attached patent claims.

Finally, it should be noted that the embodiments discussed above are only examples of the element according to the invention, but the scope is not limited to these embodiments.

The invention claimed is:

1. An acousto optical element comprising:
a crystal for transmitting light;
an electrical converter generating sound waves directed into the crystal such that the sound waves passing through the crystal change the optical properties of the crystal and therefore influence the light passing through the crystal; and
means for changing at least one of the sound waves running through the crystal and the sound field established in the interior of the crystal such that the light passing through the crystal is influenced variably; wherein
the converter consists of several individual converter segments that are independent from each other;
the converter segments comprise a segment in the middle, a segment at the right and a segment at the left, the latter two segments being disposed symmetrically with respect to the segment in the middle; and
the converter segments can be switched or activated individually or in groups.

2. The acousto optical element according to claim 1, comprising means for at least one of actuating and interconnecting the converter for changing at least one of the sound wave and the sound field established in the interior of the crystal.

3. The acousto optical element according to claim 1, wherein converter segments are provided on, at or within the crystal.

4. The acousto optical element according to claim 1, wherein the converter segments have at least one of the same form and size.

5. The acousto optical element according to claim 1, wherein the converter segments are of at least one of different forms and sizes.

6. The acousto optical element according to claim 1, wherein the individual converter segments in itself are shaped symmetrically.

7. The acousto optical element according to claim 1, wherein the converter segments are disposed symmetrically with respect to each other.

8. The acousto optical element according to claim 1, wherein the converter segments can be switched on or off in a symmetric fashion.

9. The acousto optical element according to claim 1, wherein the converter segments can be switched on or off in pairs.

10. The acousto optical element according to claim 1, wherein the converter comprises as the lowermost layer a negative electrode, preferably made of metal, an intermediate layer of a piezo material formed on the lowermost layer, and an uppermost layer formed on the intermediate layer as a positive electrode.

11. The acousto optical element according to claim 10, wherein the negative electrode is connected with the outer conductor of the coax cable and the positive electrode is connected with the inner conductor of the coax cable.

12. The acousto optical element according to claim 10, wherein at least one of the negative electrode and the positive electrode and the piezo material are segmented for forming of the converter segments.

13. The acousto optical element according to claim 1, wherein the crystal with the converter is connected to an attachment panel and on this panel disposed close to or on a circuit board and is supplied via one of the converter and the converter segments with a radio frequency.

14. The acousto optical element according to claim 13, wherein the circuit board is connected to a generator that generates radiofrequency via an electrical cable.

15. The acousto optical element according to claim 13, wherein the circuit board is connected to a generator or several different generators that generate one single or several different radio frequencies via one or more electrical cables.

16. The acousto optical element according to claim 13, wherein the circuit board comprises electronic components supplying the radio frequencies to the individual converter segments based on a respective control signal.

17. The acousto optical element according to claim 16, wherein the electronic components provide for an adjustment of the power of the radio frequency with regard to the respective form and size of the individual converter segments.

18. The acousto optical element according to claim 13, wherein the circuit board comprises a power supply.

19. The acousto optical element according to claim 13, wherein the circuit board comprises a microprocessor.

20. The acousto optical element according to claim 1, wherein the circuit board comprises a readable and preferably also writeable data memory.

21. The acousto optical element according to claim 1, wherein the acousto optical element is adapted to be positioned in the beam path of a microscope.

22. The acousto optical element according to claim 1, wherein the acousto optical element is one of the group consisting of an AOM (acousto optical modulator), an AOD (acousto optical deflector), AOTF (acousto optical tunable filter), and an AOBS (acousto optical beam splitter).

* * * * *